US009093871B2

(12) United States Patent
Artinian et al.

(10) Patent No.: US 9,093,871 B2
(45) Date of Patent: Jul. 28, 2015

(54) BIDIRECTIONAL PUMPING AND ENERGY RECOVERY SYSTEM

(75) Inventors: Herman Artinian, Huntington Beach, CA (US); Venkateshwaran Krishnan, Seal Beach, CA (US)

(73) Assignee: Calnetix Technologies, L.L.C., Cerritos, CA (US)

(*) Notice: Subject to any disclaimer, the term of this patent is extended or adjusted under 35 U.S.C. 154(b) by 1204 days.

(21) Appl. No.: 13/026,057

(22) Filed: Feb. 11, 2011

(65) Prior Publication Data

US 2012/0153620 A1 Jun. 21, 2012

Related U.S. Application Data

(60) Provisional application No. 61/425,666, filed on Dec. 21, 2010.

(51) Int. Cl.
| | |
|---|---|
| *F02C 6/00* | (2006.01) |
| *H02K 5/124* | (2006.01) |
| *F04D 29/048* | (2006.01) |
| *F04D 29/58* | (2006.01) |
| *H02K 7/09* | (2006.01) |
| *H02K 9/12* | (2006.01) |
| *F04D 13/06* | (2006.01) |
| *H02K 7/14* | (2006.01) |
| *H02K 7/18* | (2006.01) |
| *H02K 9/19* | (2006.01) |

(52) U.S. Cl.
CPC ............. *H02K 5/124* (2013.01); *F04D 13/064* (2013.01); *F04D 13/0633* (2013.01); *F04D 29/048* (2013.01); *F04D 29/5806* (2013.01); *H02K 7/09* (2013.01); *H02K 9/12* (2013.01); *H02K 7/14* (2013.01); *H02K 7/1823* (2013.01); *H02K 9/19* (2013.01); *H02K 2205/03* (2013.01); *H02K 2213/09* (2013.01)

(58) Field of Classification Search
CPC ......... H02K 9/19; H02K 9/12; H02K 7/1823; H02K 5/124
USPC ................................ 290/52; 415/106; 60/607
See application file for complete search history.

(56) References Cited

U.S. PATENT DOCUMENTS

| | | | | | |
|---|---|---|---|---|---|
| 4,253,031 | A | * | 2/1981 | Frister | 290/52 |
| 4,745,755 | A | * | 5/1988 | Kawamura | 60/608 |
| 4,769,993 | A | * | 9/1988 | Kawamura | 60/597 |
| 5,248,239 | A | * | 9/1993 | Andrews | 415/104 |
| 5,337,030 | A | * | 8/1994 | Mohler | 310/156.37 |
| 5,659,205 | A | * | 8/1997 | Weisser | 290/52 |
| 6,307,278 | B1 | * | 10/2001 | Nims et al. | 290/52 |
| 7,964,982 | B2 | * | 6/2011 | Bosen | 290/52 |
| 2006/0038460 | A1 | * | 2/2006 | Bojiuc | 310/198 |
| 2006/0289145 | A1 | * | 12/2006 | Jones | 165/80.4 |

* cited by examiner

*Primary Examiner* — Julio Gonzalez
(74) *Attorney, Agent, or Firm* — Fish & Richardson P.C.

(57) ABSTRACT

A fluid pumping and energy recovery device may include a housing that defines an impeller chamber and a motor/generator chamber. An impeller may reside within the impeller chamber; and a motor/generator may reside in the motor/generator chamber. The motor/generator may include a stator and a rotor. The rotor may be coupled to the impeller and supported (e.g., by magnetic bearings) to rotate in the stator. The rotor may generate electrical power in a generating mode and rotate in response to electrical power applied to the stator in a motoring mode. Seals may be adapted to hydraulically isolate the pump chamber from the motor/generator chamber by sealing against a rotating surface of the device. In certain instances, sealing is achieved using a bidirectional seal.

15 Claims, 2 Drawing Sheets

BIDIRECTIONAL PUMPING AND ENERGY RECOVERY SYSTEM

CLAIM OF PRIORITY

This application claims priority under 35 U.S.C. §119 to U.S. Provisional Patent Application Ser. No. 61/425,666, filed on Dec. 21, 2010, the entire contents of which are hereby incorporated by reference.

TECHNICAL FIELD

The present disclosure pertains to bidirectional energy transfer from fluids, and in particular, to pumping and energy recovery systems and apparatuses and methods for using the same.

BACKGROUND

Electric machines such as, for example, motors and generators may be used to generate mechanical power in response to an electrical input or to generate electrical power in response to a mechanical input. Motors having rotors and stators may be used to drive pumps.

SUMMARY

Integrated, bidirectional pump systems, apparatuses, and methods for using the same may be used for pumping and energy recovery and may include modular power architecture. The bidirectional pumping and energy recovery system of the present disclosure may be used to pump fluids in one operational mode and generate electricity by receiving fluid in a second operational mode. The pumping of fluids is powered externally, where an electric machine may act as a motor to drive an impeller to rotate in a first direction to pump fluids. Under certain conditions, fluid may drive the impeller to rotate the rotor in a second, opposite direction to generate electricity. The bidirectional pumping and energy recovery system, thus, may be used to both drive the pumping fluids and receive fluids to generate electricity.

A fluid pumping and energy recovery device may include a housing defining an impeller chamber and a motor/generator chamber. The impeller chamber may include an impeller. The motor/generator chamber may include a motor/generator that includes a stator and a rotor. The rotor may be coupled to the impeller and supported to rotate in the stator. The rotor may rotate in the stator to generate electrical power in a generating mode. In addition, the rotor may rotate in response to electrical power applied to the stator in a motoring mode. The apparatus may include one or more seals adapted to seal against a rotating surface of the device. The one or more seals may include at least one seal configured to seal against the rotating surface of the device rotating in a first direction. The apparatus may include at least one seal configured to seal against the rotating surface of the device rotating in a second, opposite direction. The one or more seals are configured to hydraulically isolate the pump chamber from the motor/generator chamber. In certain instances, a single, bidirectional seal may be used as the seal to hydraulically isolate the impeller chamber and the motor/generator chamber. In certain instances, a single-directional seal is used in one operating mode to seal against a rotation of a surface rotating in the first direction; and a different, single-directional seal is used to another operating mode to seal against rotation of the surface rotating in the second, opposite direction.

In some embodiments, a system may include a pumping and energy recovery apparatus, an electronics package, and a first and second conduit. The apparatus may include a rotor supported to rotate in a stator. The apparatus may also include a wheel coupled to the rotor. The wheel may be configured to rotate in a first radial direction in response to fluid flowing from a high pressure area to a low pressure area and configured to rotate in a second, opposite radial direction to pump fluid from the low pressure area to the high pressure area. One or more seals may be adapted to seal against a rotating surface of the apparatus. The one or more seals may include a first seal adapted to seal against the rotating surface rotating in the first radial direction and a second seal adapted to seal against the rotating surface rotating in the second, opposite radial direction. The one or more seals may be adapted to hydraulically isolate the rotor and the wheel. In certain instances, the first seal and the second seal may be a single seal, such as a bidirectional seal. The electronics package may be configured to receive electrical power generated by the rotor rotating in the first radial direction and provide electrical power to the stator to rotate the rotor in the second radial direction. The first conduit may be configured to conduct fluid between the high pressure area and the wheel, and the second conduit may be configured to conduct fluid between the low pressure area and the wheel.

In certain embodiments, a method may include pumping a fluid from a low pressure zone to a high pressure zone in response to electric power received by an electric machine. The electric power may rotate the electric machine in a first rotational direction. The fluid may be kept isolated from the electric machine rotating in the first rotational direction, for example, by sealing the electric machine from the fluid. In other words, the seal acts to prevent unintended passage of fluids into the electric machine during operating modes in which the electric machine rotates in the first rotational direction. Electric power may be generated with the electric machine in response to the fluid flowing from a high pressure zone to a low pressure zone, the fluid rotating the electric machine in a second rotational direction, opposite the first rotational direction. The fluid may be kept isolated from the electric machine when the machine is rotating in the second rotational direction. In certain instances of the embodiments, a bidirectional seal may facilitate the isolation of the electric machine from unintended contact with the fluid.

In certain instances of the embodiments, the fluid pumping and energy recovery device may also include a magnetic bearing supporting the rotor to rotate in the stator. The magnetic bearing may have a thrust capability. In some implementations, the device also includes a controller coupled to the magnetic bearing that is adapted to control the axial position of the rotor based at least in part on a distance between the seal and its mating surface. In certain instances, the mating surface may be an axial surface of the impeller.

In certain instances of the embodiments, the rotor may be coupled to the impeller to rotate at the same speed. In some embodiments, the rotor and the impeller are cast as a single piece. In some embodiments, the rotor and the impeller are directly connected.

In certain instances of the embodiments, the housing includes an integrated pipe structure, the integrated pipe structure adapted to communicate fluid through the housing structure to cool the housing structure.

In some implementations of the embodiments, the device includes a self-driven impeller or fan coupled to the rotor, on a side opposite the pumping impeller, the self-driven fan configured to drive gas through the motor/generator chamber.

In some embodiments, the device includes a plurality of stator windings coupled to the stator. The stator windings may be configurable based on one or more operational characteristics of the motor/generator to different output characteristics of voltage and/or current.

In certain implementations of the embodiments, the pumping and energy recovery apparatus may include a housing having a radially inward facing wall and a radially outward facing wall. A tubing structure may reside within the housing between the inward facing wall and the outward facing wall, the tubing structure adapted to communicate fluid through the housing to cool the housing structure. In certain instances, the tubing is constructed (e.g., cast) from a single piece of metal. In certain implementations, the pumping and energy recovery apparatus further comprises a fan residing at a side of the apparatus opposite the wheel, the fan configured to circulate fluid across the rotor in a closed loop to cool the rotor.

In some implementations of the embodiments, in an energy recovery mode, the first conduit conducts fluid from the high pressure area to the wheel and the second conduit conducts the fluid from the wheel to the low pressure area. The wheel may rotate the rotor in the stator in response to the fluid flowing from the high pressure area to the low pressure area. In a pumping mode, the second conduit may conduct fluid from the low pressure area to the wheel and the first conduit conducts the fluid from the wheel to the high pressure area, the wheel pumping the fluid in response to rotation of the rotor in the stator.

Certain implementations of the embodiments include measuring one or more performance metrics associated with the electric machine and adjusting the bidirectional seal based on the one or more performance metrics. Such performance metrics can include flow rates, leakage rates, power generated by rotation of the rotor, power used to rotate the rotor, and others. In some implementations, the high pressure zone is a fluid accumulator and the low pressure zone is a fluid distribution system or network.

In certain implementations, the bidirectional pumping and energy recovery system may be used at let down stations for water distribution. For example, as high pressure water enters the process loop associated with the pump, the pressure or mass flow of the water may drive the impeller to generate electricity. The device may be used to let down the pressure, and then to subsequently distribute the water to lower pressure channels as needed. Alternately, when high pressure is required to be delivered to the fluid, the device may run as a pump.

Similarly, the bidirectional pumping and energy recovery device of the present disclosure may be used at water storage stations. When electricity is available, the system may be used to pump water to the reservoir. When demand for water is high, the system may permit water to drive the impeller (high pressure to low pressure) to let down the water pressure for distribution, the impeller driving a rotor to generate electricity. When demand for water is low, the pump may drive low pressure water to the high pressure regions (e.g., for storage) through rotation of the impeller, which is then driven by the rotor.

Other applications are readily apparent. For example, the bidirectional pump and energy recovery system of the present disclosure may be used in well applications. For high pressure wells, a single or multiphase fluid may enter the impeller to drive the rotor to generate electricity. The device may also be used to pump the fluid to a well head or reservoir or other storage area. In certain implementations, the device disclosed herein may be used for desalination applications for sea water, ground water, or brackish water desalination. The system components may be constructed of abrasive- or corrosive-resistant materials.

In certain implementations of the embodiments, the pumping and energy recovery apparatus further comprises a housing that houses the rotor and the wheel; and wherein the fan is a blower external to the housing. In certain instances, the fan is directly coupled to the rotor.

In certain implementations of the embodiments, the rotor includes one or more permanent magnets, and the motor/generator generates electricity in the generate mode based on a magnetic flux created in an air gap between the rotor and the stator based on rotation of the rotor in the stator. In some embodiments, the rotor diameter is configurable to change the magnetic flux created in the air gap. In some embodiments, the one or more permanent magnets are configurable to change the magnetic flux in the air gap.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1A:
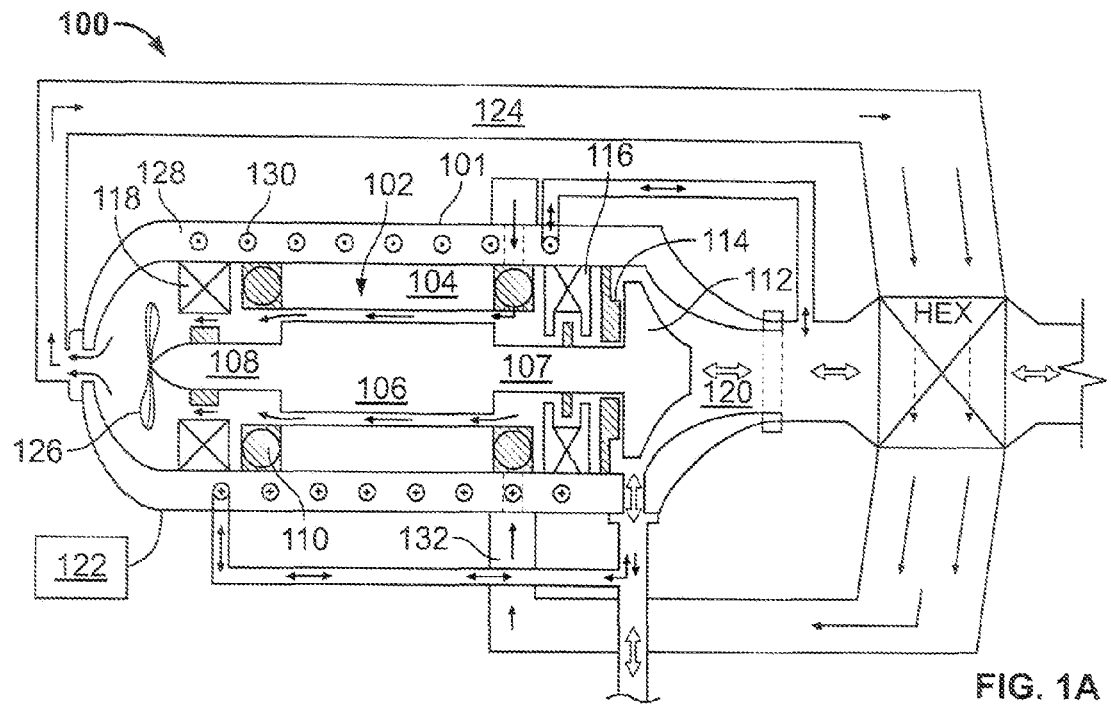
FIG. 1A is a cross-sectional schematic of a bidirectional pumping and hydraulic energy recovery system in accordance to the present disclosure.

FIG. 1A is a cross-sectional schematic of a bidirectional pumping and energy recovery system 100 in accordance to the present disclosure. The bidirectional pumping and (hydraulic) energy recovery system 100 may be used in two operational modes: in certain instances, the bidirectional system may be used to pump fluid and in some instances, the bidirectional system may be used to recover energy (such as electrical energy) as fluid enters the bidirectional system. Both operational modes may be achieved without removing or replacing components of the bidirectional system. Further, the system uses bidirectional sealing to facilitate pumping and energy recovery operational modes.

The bidirectional pumping and energy recovery system 100 (briefly, bidirectional pump system 100) includes an electric machine 102 in an integral pump housing 101. Electric machine 102 includes a stator 104 and a rotor 106, which may be an integral rotor. The stator 104 and rotor 106 share an axis 108. In general, rotor 106 may reside within a gap defined by stator 104 and is configured to rotate around the shared axis 108. Rotor 106 may be integrated with an impeller 112. In certain instances, impeller 112 and rotor 106 are cast from a single piece. In some instances, the impeller 112 is directly affixed to the rotor 106, or to an intermediate common shaft, for example, by fasteners, rigid drive shaft, welding, or other manner. The impeller 112 is received over an end of the rotor 106, and held to the rotor 106 with a shaft 107. The shaft 107 may thread into the rotor 106 at one end, and at the other, captures the impeller 112 between the end of rotor 106 and a nut threadingly received on the shaft 107. The impeller 112 and rotor 106 may be coupled without a gearbox and rotate at the same speed. In other instances, the impeller 112 can be indirectly coupled to the rotor 106, for example, by a gear train, clutch mechanism, or other manner. In certain implementations, rotor 106 and stator 104 may be potted, coated, or otherwise protected from abrasive or corrosive materials. In certain instances, some or all of the internal components of the pump housing 101 may be made of an abrasive- or corrosive-resistant material (e.g., Inconel, etc.). Impeller 112 may be an axial impeller, a centrifugal impeller, or a hybrid. In addition, impeller 112 may be a single-stage impeller or multi-stage impeller; likewise, impeller 112 may be a single-phase impeller or a multi-phase impeller. In general, the term "impeller" is not limited to usage in pumping contexts, and includes other contexts, such as in generators and turbines.

The electric machine 102 is configured to generate electricity in response to the rotation of the rotor 106. In certain instances, the rotor 106 can include one or more permanent magnets. The stator 104 includes a plurality of conductive coils 110. Electrical current is generated within the coils of the stator 104 by the rotation of the magnet. The rotor 106 and stator 104 can be configured as a synchronous, permanent magnet, multiphase AC generator. In certain instances, stator 104 may include coils 110. When the rotor 106 is rotated, a voltage is induced in the stator coil 110. At any instant, the magnitude of the voltage induced in coils 110 is proportional to the rate at which the magnetic field encircled by the coil 110 is changing with time (i.e., the rate at which the magnetic field is passing the two sides of the coil 110). In instances where the rotor 106 is coupled to rotate at the same speed as the impeller 112, the electric machine 102 is configured to generate electricity at that speed. Such an electric machine 102 is what is referred to as "high speed." The electric machine enclosure may be integral to the pump enclosure as a cylindrical or similar cartridge. The design of the present system avoids issues associated with a coupled sealed approach (i.e., shaft coupled seal) between the electrical and hydraulic parts, such as bulk, alignment issues, and unidirectional orientation of most effective seals in the coupled sealed approach, especially at high pressure. In certain implementations, the electric machine 102 incorporates multiple operating points into a single envelope design geometry, while maintaining increased operational volume and reduced parts count. Further, the bidirectional pump may be compact and skid-mounted for portability.

Stator 104, rotor 106, and stator coils 110 may be reconfigured based on the operation of the bidirectional pump. For example, the coils may be changed by changing the number of windings per pole. Similarly, the number of phases in parallel or the number of phases in series may be changed. By changing the windings configuration, the same stator may be used in multiple different uses, and in multiple different power levels. Similarly, the stator geometry may be changed. For example, the stator length may be changed with or without changing the coil configuration to achieve a certain operating point. The rotor may also be changed to achieve a certain operating point. For example, the rotor diameter may be changed, the magnetic elements used on the rotor can be changed, or, more generally, the magnetic flux in the gap between the rotor and the stator can be changed based on the rotor configuration to achieve a desired operating point. The term operating point implies a relationship between the geometry of the hardware components, the power electronics, the speed of the rotor, and other operating conditions to achieve a particular result, such as a particular output power.

The conditioning of the power by the power electronics 122 communicably coupled to the stator assembly may be optimized for the electric machine 102 configuration. For example, a 1 MW power electronics is undesirable when outputting 100 kW output. Conversely, a 1 MW rated machine can provide 100 kW power because the cost associated with 100 kW-rated power electronics would permit the disparity: in general, power electronics 122 cost more per kilowatt than the machine components. Likewise, the power electronics 122 tend to be easier to change and configure, and the power electronics 122 do not come into contact with fluids, such as corrosive fluids or pump fluids. To optimize the usage of the power electronics 122, it is desirable to output the full voltage from the machine. Voltage drops per speed in a linear way: so if the machine runs at 10000 rpm and outputs 480V, a speed of 5000 rpm outputs 240V for the same machine. As such, the stator 104, rotor 106, or windings 110 may be configured to output a particular voltage based on the speed of the machine, and the voltage optimized for a power rating associated with the power electronics 122 used in the implementation. As discussed above, the windings 110 may be changed by changing the number of turns per pole, the number of phases in series or in parallel (i.e., the number of series or parallel paths), or by other ways. The reconfiguration of the machine as applied to the stator 104, rotor 106, and the power electronics 122 may be implemented without a significant physical re-manufacture of the machine through this innovation. For example, the machine components, such as the stator 104, stator 106, and windings 110, may be changed in the field, permitting remote changes to the system without the burden of removing the system from its operating location.

Windings 110 of stator 104 may be potted or otherwise sealed to protect the stator windings 110 from incidental or unintentional contact with corrosive or erosive materials that may leak into the open regions within pump housing 101. Likewise, the stator and rotor may also be potted, which permits the device to operate in the presence of incidental fluids as well as if the inner chambers of the housing 101 become flooded.

As shown in FIG. 1A, bearings 116 and 118 are arranged to rotatably support the rotor 106 and impeller 112 relative to the stator 104, and the generator casing. The impeller 112 is supported in a cantilevered manner by the bearings 116 and 118. In certain instances, a multitude of bearings may be applied across the length of the rotor. In certain instances, one or more of the bearings 116 or 118 can include magnetic bearings, ball bearings, needle bearings, journal bearings, or other. The bearings 116 and 118 need not be the same types of bearings. In certain instances, the bearings 116 and 118 comprise magnetic bearings. As an example, U.S. Pat. No. 6,727,617 assigned to Calnetix, Inc. describes bearings suitable for use as bearings 116 and 118. Bearing 116 may be a combination radial and thrust bearing, supporting the rotor 106 in radial and axial directions. Bearing 118 may be a radial bearing, supporting the rotor 106 radially. Other configurations could be utilized. Magnetic bearings may increase the efficiency of the bidirectional pump system. Further, magnetic bearings may prolong the life of the system. In certain implementations, the magnetic bearing 116 may be used to adjust the position of seal 114. Magnetic bearing 116 may be used to maintain a relative positioning of the impeller with respect to the seal 114, as well as with respect to the pump housing 101. Along similar lines, the magnetic bearing 116 may be used to maintain a gap between the rotor 106 and the stator 104 during operation of the bidirectional pump 100. Further, magnetic bearing 116 may be used to sense vibration, and derive a frequency and/or magnitude of the vibrations. Vibrations may indicate failure points in the bidirectional pump 100 or other operational issues, such as damaged components, leakage, or the presence of slugs in the pump housing 101.

In the embodiments in which the bearings 116 and 118 are magnetic bearings, the turbine generator apparatus 100 may include one or more backup bearings. For example, at start-up and shut down or in the event of a power outage that affects the operation of the magnetic bearings 116 and 118, first and second backup bearings may be employed to rotatably support the impeller 112 during that period of time. The backup bearings may comprise ball bearings, needle bearings, journal bearings, or the like. In certain instances, the backup bearing includes ball bearings that are arranged near the magnetic bearing 116. Also, the backup bearings may be arranged near the magnetic bearing 118. Thus, in certain instances, even if the main bearings 116 and 118 temporarily fail (e.g., due to an electric power outage or other reason), the backup bearings would continue to support both the impeller 112 and the rotor 106.

The bidirectional pump system 100 includes a bidirectional seal 114. Bidirectional seal 114 is disposed proximate a lateral face/side of impeller 112, which acts as a sealing surface. In FIG. 1A, bidirectional seal 114 is disposed on an interior side of impeller 112, between impeller 112 and stator 104. In some implementations, the bidirectional seal 114 is disposed between impeller 112 and magnetic bearing 116. Magnetic bearing 116 may be used to adjust the axial and/or radial position of the rotor 106 (or, more generally, shaft 107) to adjust the performance of seal 114. The integrity of the seal formed by bidirectional seal 114 may change based on the position of the rotor shaft 107 relative to the seal 114 or based on the quality of the seal over time (e.g., the seal may erode based on friction, corrosion, or other factors). Magnetic bearing 116 (as well as other magnetic support bearings) support the rotor to rotate in both rotational directions. For example, in a motoring mode, the magnetic bearing 116 may support the rotor to rotate in a first rotational direction; and in a generating mode, the magnetic bearing 116 may support the rotor to rotate in a second rotational direction, opposite the first rotational direction. In certain implementations, the performance of the bidirectional seal 114 may be monitored based on various performance metrics. The metrics may provide information about the seal 114, such as changes in seal performance against an initial baseline performance or the relative position of the seal to some baseline starting position. In some implementations, leakage in the pump may be measured against an initial baseline measurement. The seal position may be dynamically adjusted, on the fly or periodically, to improve the performance of the seal 114 (and, more generally, the system), by, e.g., matching the measured performance metrics to the measured baseline. In addition, the position of seal 114 may be adjusted until a desired performance level is achieved. For example, if fluid in channel 120, which is directed toward impeller 112, leaks through seal 114, the change in pressure drop across the impeller 112 may affect the speed of the rotor 106. This change, in turn, may affect the output voltage of the electric machine 102. Thus, changes in output voltage may be used to determine problems associated with seal 114; and likewise, magnetic bearings 116 may be used to position seal 114 to achieve an optimized voltage output. A modular bidirectional power electronic circuit may be used in certain implementations, wherein the modularity of the power electronics 122 matched by the reconfiguration of the stator and rotor provide multiple operational design points within the same design geometrical envelope.

In certain implementations, the integral electric machine housing 101 is adapted as a cooling jacket 128 with a single cast piece with stainless steel tubing 130 for the passage of process fluid around the stator 104 without the additional requirement of a pumping system. Fluid output from impeller 112 may be directed to tubing 130 to provide a coolant for the electric machine 102. Fluid from the process may be introduced to the tubing 130 for cooling purposes. The fluid may be under pressure in either operating mode, and the direction of the fluid may be controlled by a valve to enter the tubing 130 in either mode.

Figure 1B:
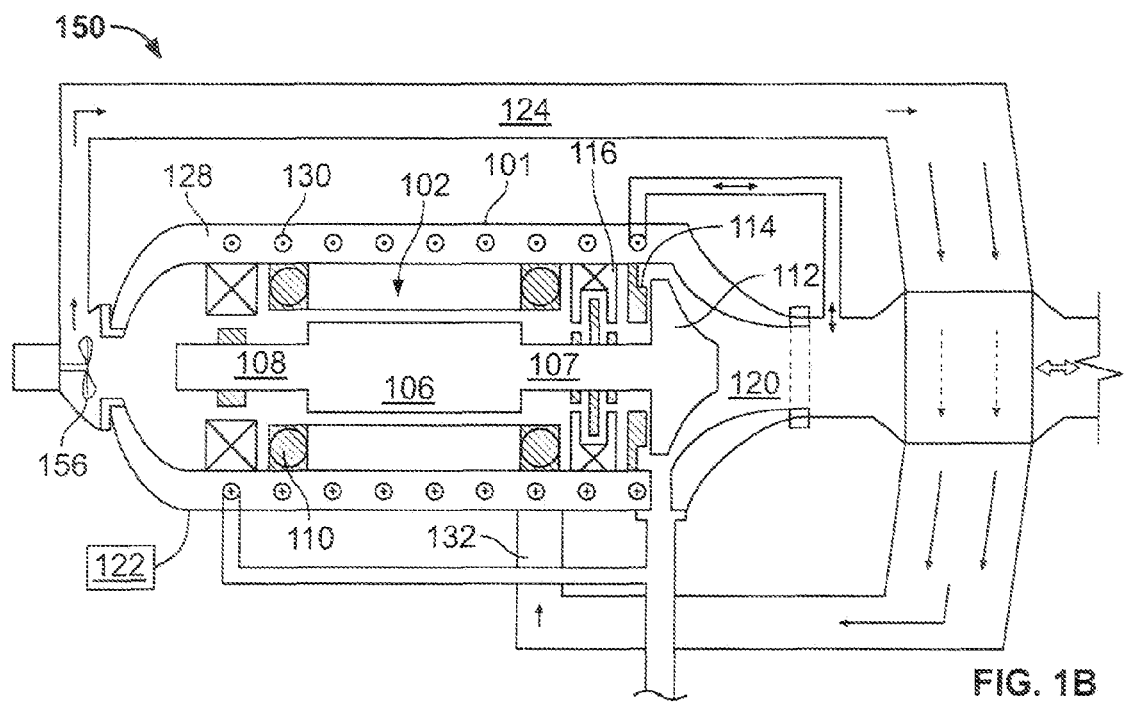
FIG. 1B is a cross-sectional schematic of a bidirectional pumping and hydraulic energy recovery system in accordance with an embodiment of the present disclosure.
Figure 1C:
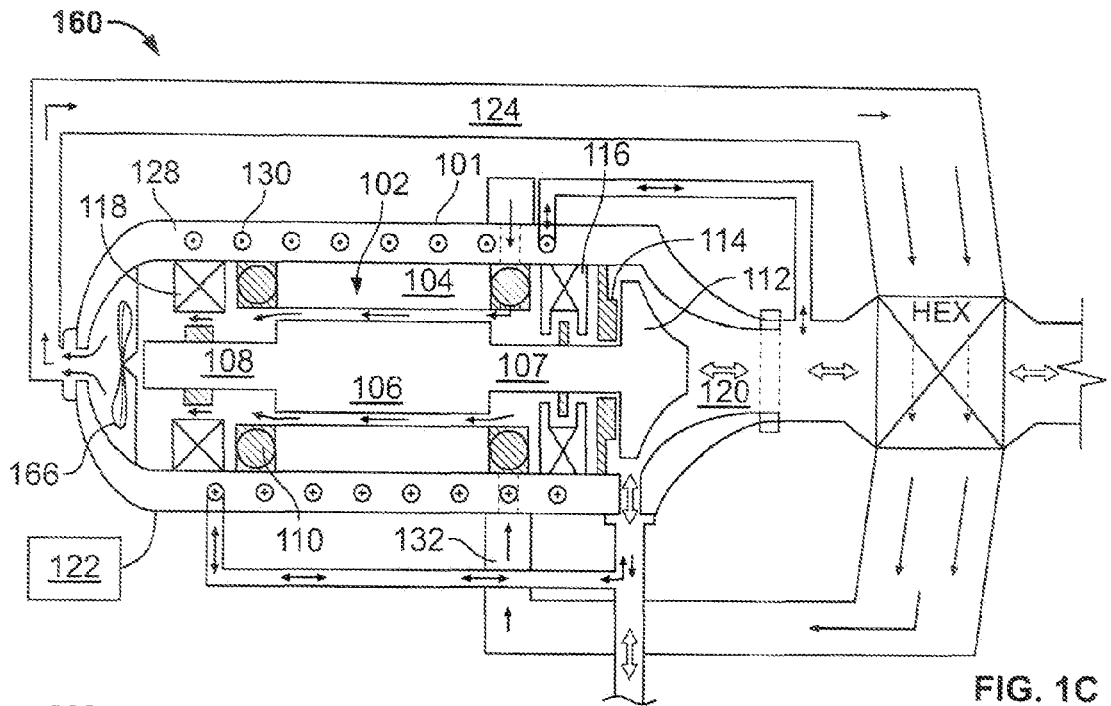
FIG. 1C is a cross-sectional schematic of a bidirectional pumping and hydraulic energy recovery system in accordance with an embodiment of the present disclosure.

In certain embodiments, the air gap between the stator 104 and the rotor 106 is cooled by an integral impeller 126 on the shaft 107 of the electric machine 102 that circulates closed loop clean air through channel 124 that can be cooled by the process fluid. Fluid, e.g., a gas, may enter the machine housing 101 through channels 132 for cooling purposes. Integral impeller 126 may be self-driven in certain implementations. Impeller 126 may be an axial or centrifugal impeller and may operate at high or low speeds. For example, impeller 126 may be a fan or impeller. The fan 126 may be mounted in the housing 101. In some implementations, impeller 126 may be coupled to shaft 107 to rotate with rotor 106. Alternatively, impeller 126 may be indirectly coupled to shaft 107 by fasteners, rigid drive shaft, welding, or other manner. For example, FIG. 1B is a cross-sectional schematic of a bidirectional pumping and hydraulic energy recovery system in accordance with an embodiment of the present disclosure. In FIG. 1B, the fan 156 is mounted to the housing 101. In such embodiments, the fan 156 may be self-driven or powered externally. FIG. 1C illustrates another embodiment. FIG. 1C is a cross-sectional schematic of a bidirectional pumping and hydraulic energy recovery system 160 in accordance with an embodiment of the present disclosure In FIG. 1C, the housing 101 has one or more air gaps to provide ventilation. The fan 166 may be a blower receiving air from the air gaps and providing ventilation for the system. The machine components may be designed to be able to operate despite contact with the process fluid, even in a flooded condition.

Figure 2:
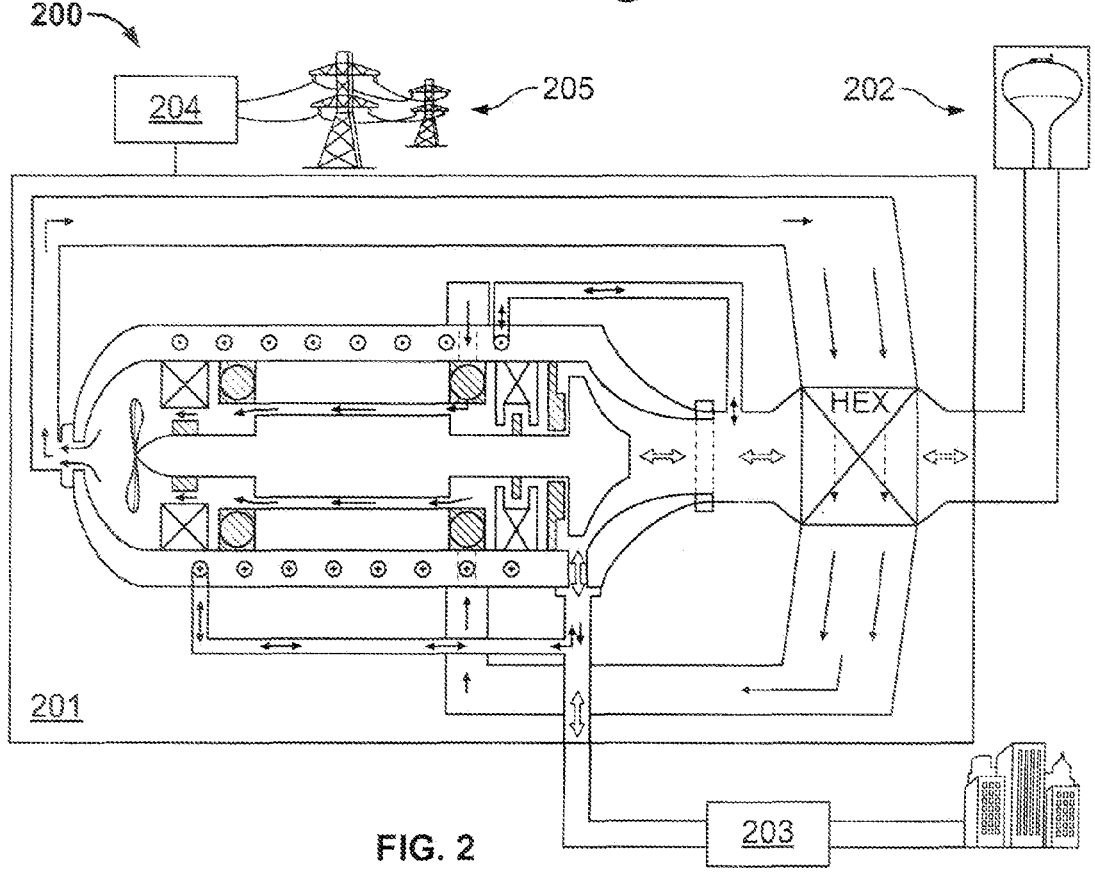
FIG. 2 is a schematic representation of an example environment including the bidirectional pumping and hydraulic energy recovery system of the present disclosure.

FIG. 2 is a schematic representation of an example environment 200 including the pumping and hydraulic energy recovery device of the present disclosure. Environment 200 includes a pumping and energy recovery device 201, which is similar to the pumping and energy recovery device illustrated in FIGS. 1A-C. The device 201 is connected to a high pressure area 202 and a low pressure area 203. The device 201 communicates fluid with the high pressure area 202 and the low pressure area 203. The device 201 may act as a pump. When acting as a pump, the device 201 pumps fluid from the low pressure area 203 to the high pressure area 202. The device 201 pump is driven by an electric machine having a rotor supported to rotate within a stator. An electronics package 204 can provide power to the stator (i.e., by providing current to the stator windings). The device pump may be an impeller that is connected to the rotor, both of which rotate in a first rotational direction (and in certain embodiments, at the same speed) in response to electrical power provided to the stator. The device 201 may act as an energy recovery device when operated in a generate mode. When in the generate mode, the impeller rotates in a second rotational direction, opposite the first direction, in response to fluid flowing from the high pressure area to the low pressure area. The rotation of the impeller rotates the rotor within the stator. The rotation of the rotor in the stator generates electrical power. In either mode of operation, the device includes a seal that seals the motor/generator portion (i.e., the rotor and stator portion) of the device from the wheel. The seal may be a bidirectional seal that seals against a rotating surface of the device when the rotating surface of the device is rotating in either the first direction or the second direction.

The high pressure area 202 may be a water tank, a reservoir, a well, an accumulator, or other high pressure zones. The low pressure area 203 may be a water distribution station, such as those used to distribute water to residences. Alternatively, low pressure zone 203 may be an intermediate area for distribution of the fluid, or other low pressure zones. The notation of high versus low pressure is understood to be a relativistic concept, where a high pressure zone contains or holds fluid at a high pressure relative to the pressure the same fluid is held at the low pressure zone. Electrical power may be provided by power electronics package 204, which may receive power from a power grid 205. Similarly, the power electronics package 204 may receive power generated by the device 201, and deliver power to a power storage facility.

Though described herein as a bidirectional pumping and energy recovery system, it is understood that the device may be used as one of a pump or an energy recovery system. Further, components may be chosen to optimize the operation of the device to perform as either a pump or an energy recovery system.

Although this disclosure has been described in terms of certain implementations and generally associated methods, alterations and permutations of these implementations and methods will be apparent to those skilled in the art. Accordingly, the above description of example implementations does not define or constrain the disclosure. Other changes, substitutions, and alterations are also possible without departing from the spirit and scope of this disclosure, and such changes, substitutions, and alterations may be included within the scope of the claims included herewith.

What is claimed is:

1. A fluid pumping and energy recovery device, comprising:
    a housing defining an impeller chamber and a motor/generator chamber;
    an impeller in the impeller chamber;
    a motor/generator in the motor/generator chamber and comprising a stator and a rotor, the rotor coupled to the impeller and supported to rotate in the stator and generate electrical power in a generating mode and rotate in response to electrical power applied to the stator in a motoring mode; and
    one or more seals adapted to seal against a rotating surface of the device, the one or more seals including at least one seal configured to seal against the rotating surface of the device rotating in a first direction and including at least one seal configured to seal against the rotating surface of the device rotating in a second, opposite direction, the one or more seals configured to hydraulically isolate the impeller chamber from the motor/generator chamber.

2. The fluid pumping and energy recovery device of claim 1, further comprising at least one magnetic bearing supporting the rotor to rotate in the stator.

3. The fluid pumping and energy recovery device of claim 2, wherein the at least one magnetic bearing supports the rotor to rotate in the first and second directions.

4. The fluid pumping and energy recovery device of claim 1, further comprising electronics circuitry configured to receive electrical power generated in the generating mode and provide electrical power to the stator to rotate the rotor in the motoring mode.

5. The fluid pumping and energy recovery device of claim 2, wherein the magnetic bearing comprises a thrust capability; and
    further comprising a controller coupled to the magnetic bearing and adapted to control an axial position of the rotor based at least in part on a distance between the seal and the impeller.

6. The fluid pumping and energy recovery device of claim 1, wherein the rotor is coupled to the impeller to rotate at the same speed.

7. The fluid pumping and energy recovery device of claim 1, wherein the housing comprises a radially inward facing wall and a radially outward facing wall and includes a tubing structure residing within the housing between the inward facing wall and the outward facing wall, the tubing structure adapted to communicate fluid through the housing to cool the housing.

8. The fluid pumping and energy recovery device of claim 1, wherein the impeller is a pumping impeller, and the device further comprising a system-circulation impeller residing in the housing, on a side of the impeller chamber opposite the pumping impeller, the system-circulation impeller configured to drive fluid through the motor/generator chamber in a closed loop to cool the motor/generator chamber and the impeller chamber.

9. The fluid pumping and energy recovery device of claim 1, further comprising a plurality of stator windings, the stator windings configurable based on one or more operational characteristics of the motor/generator.

10. The fluid pumping and energy recovery device of claim 1, wherein the rotor includes one or more permanent magnets, and the motor/generator generates electricity in the generate mode based on a magnetic flux created in an air gap between the rotor and the stator based on rotation of the rotor in the stator.

11. The fluid pumping and energy recovery device of claim 10, wherein a rotor diameter is configurable to change the magnetic flux created in the air gap.

12. The fluid pumping and energy recovery device of claim 10, wherein the one or more permanent magnets are configurable to change the magnetic flux in the air gap.

13. The fluid pumping and energy recovery device of claim 1, wherein the rotor includes one or more permanent magnets, and the motor/generator generates electricity in the generate mode based on a magnetic flux created in an air gap between the rotor and the stator based on rotation of the rotor in the stator.

14. The fluid pumping and energy recovery device of claim 1, further comprising an axis of rotation concentric with the rotor, the axis of rotation defining a longitudinal direction parallel to the axis of rotation, and wherein the seal is configured to seal against a side of the rotating surface normal to the longitudinal direction.

15. The fluid pumping and energy recovery device of claim 1, further comprising adjusting a position of the one or more seals in a longitudinal direction based on one or more performance metrics.

* * * * *